United States Patent
Robinson et al.

(10) Patent No.: US 8,878,821 B2
(45) Date of Patent: Nov. 4, 2014

(54) SYSTEM AND METHOD FOR PROVIDING OBJECT LOCATION INFORMATION AND PHYSICAL CONTACT INFORMATION

(75) Inventors: Ian N Robinson, Pebble Beach, CA (US); Kar-Han Tan, Sunnyvale, CA (US); Daniel George Gelb, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 110 days.

(21) Appl. No.: 13/695,261

(22) PCT Filed: Apr. 29, 2010

(86) PCT No.: PCT/US2010/033036
§ 371 (c)(1),
(2), (4) Date: Oct. 29, 2012

(87) PCT Pub. No.: WO2011/136783
PCT Pub. Date: Nov. 3, 2011

(65) Prior Publication Data
US 2013/0050145 A1    Feb. 28, 2013

(51) Int. Cl.
*G06F 3/042* (2006.01)
*G06F 3/0488* (2013.01)

(52) U.S. Cl.
CPC .... *G06F 3/0488* (2013.01); *G06F 2203/04106* (2013.01); *G06F 2203/04101* (2013.01); *G06F 3/0425* (2013.01)
USPC .......................................... 345/175; 345/174

(58) Field of Classification Search
CPC ..... G06F 3/041; G06F 3/0412; G06F 3/0418; G06F 3/0421; G06F 3/0425; G06F 3/045; G06F 3/044; G06F 2203/04101; G06F 2203/04104; G06F 2203/04106; G06F 2203/04108
USPC ..................... 345/173–178; 178/18.01–19.04
See application file for complete search history.

(56) References Cited

U.S. PATENT DOCUMENTS 5,272,470 A * 12/1993 Zetts ............................. 345/173
2006/0161871 A1* 7/2006 Hotelling et al. ............. 715/863
(Continued)

FOREIGN PATENT DOCUMENTS

| JP | 2005-031799 A | 2/2005 |
| JP | 2007-514242 A | 5/2007 |
| JP | 2009-255903 A | 11/2009 |

OTHER PUBLICATIONS

International Search Report and Written Opinion of the International Searching Authority, mailed Jan. 27, 2011, issued in related PCT Application No. PCT/US2010/033036.

(Continued)

*Primary Examiner* — Liliana Cerullo

(57) ABSTRACT

The present invention provides a method (500) executed on a processor for providing object information about an object in proximity to a display screen. The method includes the step of determining whether an at least first object is located within a proximal distance of the first surface of the display screen based on information provided by a depth camera (step 510). The method also includes the step of determining whether the at least first object has physically contacted a first surface of the display screen based on information provided by a physical contact sensing component (step 520). The information about (1) the proximal distance of the at least first object from the screen and (2) whether the at least first object has physically contacted the display surface of the screen to provide proximal event information and based on the information provided, it is determining whether the user interface should be modified (step 560).

15 Claims, 6 Drawing Sheets

(56) References Cited

U.S. PATENT DOCUMENTS

2007/0298882 A1* 12/2007 Marks et al. .................. 463/36
2008/0012835 A1*  1/2008 Rimon et al. ................ 345/173
2008/0231608 A1*  9/2008 Nagata ........................ 345/173
2009/0217211 A1   8/2009 Hildreth et al.
2009/0303199 A1* 12/2009 Cho et al. .................... 345/173
2010/0056277 A1   3/2010 Marks et al.

OTHER PUBLICATIONS

Andrew D. Wilson, "TouchLight. An Imaging Touch Screen and Display for Gesture-Based Interaction," Microsoft Research, ICMI'04, Oct. 13-15, 2004, State College, Pennsylvania, USA, ACM, Available at: <research.microsoft. com/en-us/um/people/awilson/publications/wilsonicmi2004/ICMI%202004%20TouchLight.pdf>.

* cited by examiner

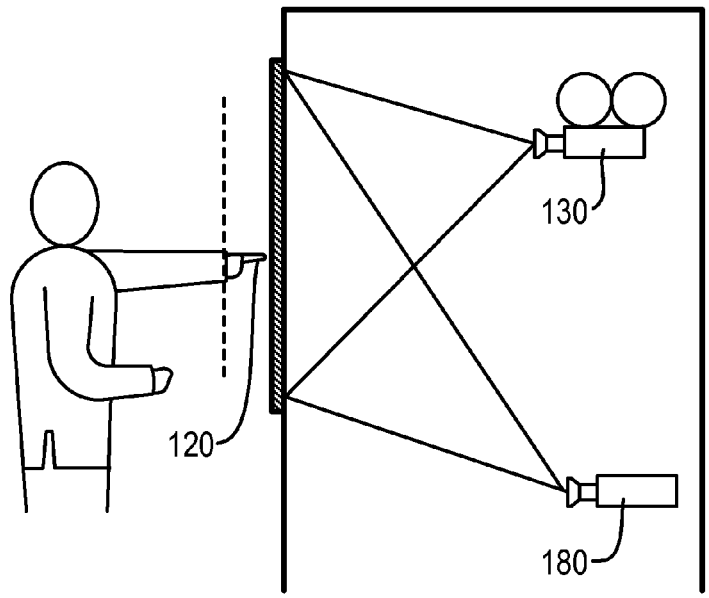
*Figure 2*
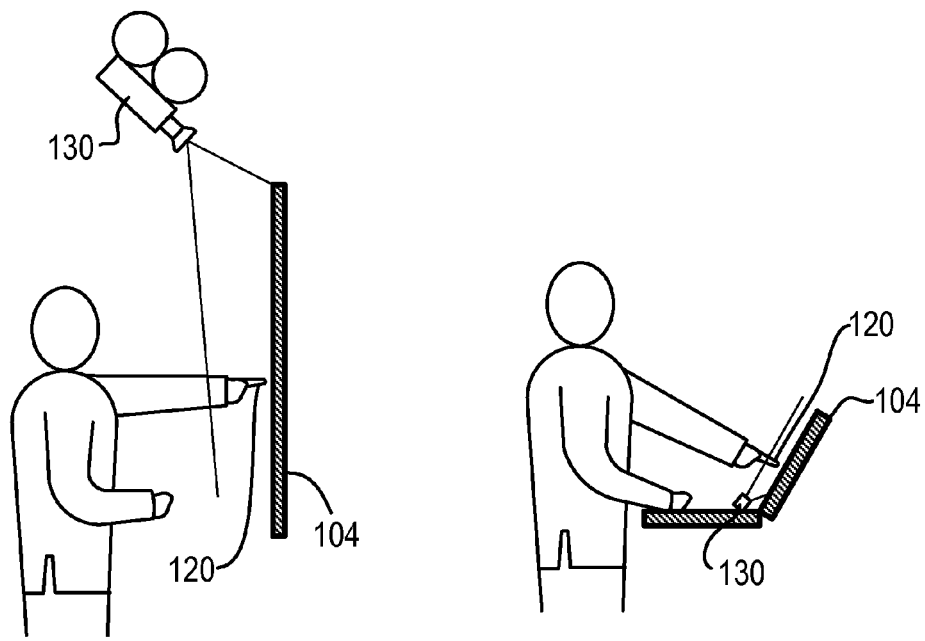
*Figure 3*
*Figure 4*

SYSTEM AND METHOD FOR PROVIDING OBJECT LOCATION INFORMATION AND PHYSICAL CONTACT INFORMATION

BACKGROUND

Digital computing devices which provide a touch user interface are desirable. A number of touch screen devices exist. Touch screens, for example that use resistive touch screens, can register single touch reliably. However, for touch screens registering physical contact, touches over longer distances (for example when dragging an icon) can result in the object dragging the icon breaking contact with the screen surface. Further, many touch screens devices do not support a hover state. Thus, the screen cannot sense the presence of a finger or object held close to, but not physically touching the screen. Also, many touch screens cannot distinguish between a single touch and multiple fingers or objects touching the screen surface. The ability to sense multiple simultaneous touches increases the richness of user interfaces available for digital devices.

BRIEF DESCRIPTION OF DRAWINGS

The figures depict implementations/embodiments of the invention and not the invention itself. Some embodiments are described, by way of example, with respect to the following Figures.

FIG. 2 illustrates a schematic representation of a visual-collaboration system in accordance with the block diagram of FIG. 1 according to one embodiment of the present invention;

FIG. 3 illustrates a schematic representation of a touch screen board according to an embodiment of the present invention;

FIG. 4 illustrates a schematic representation of a notebook personal computer according to an embodiment of the present invention.

Figure 1:
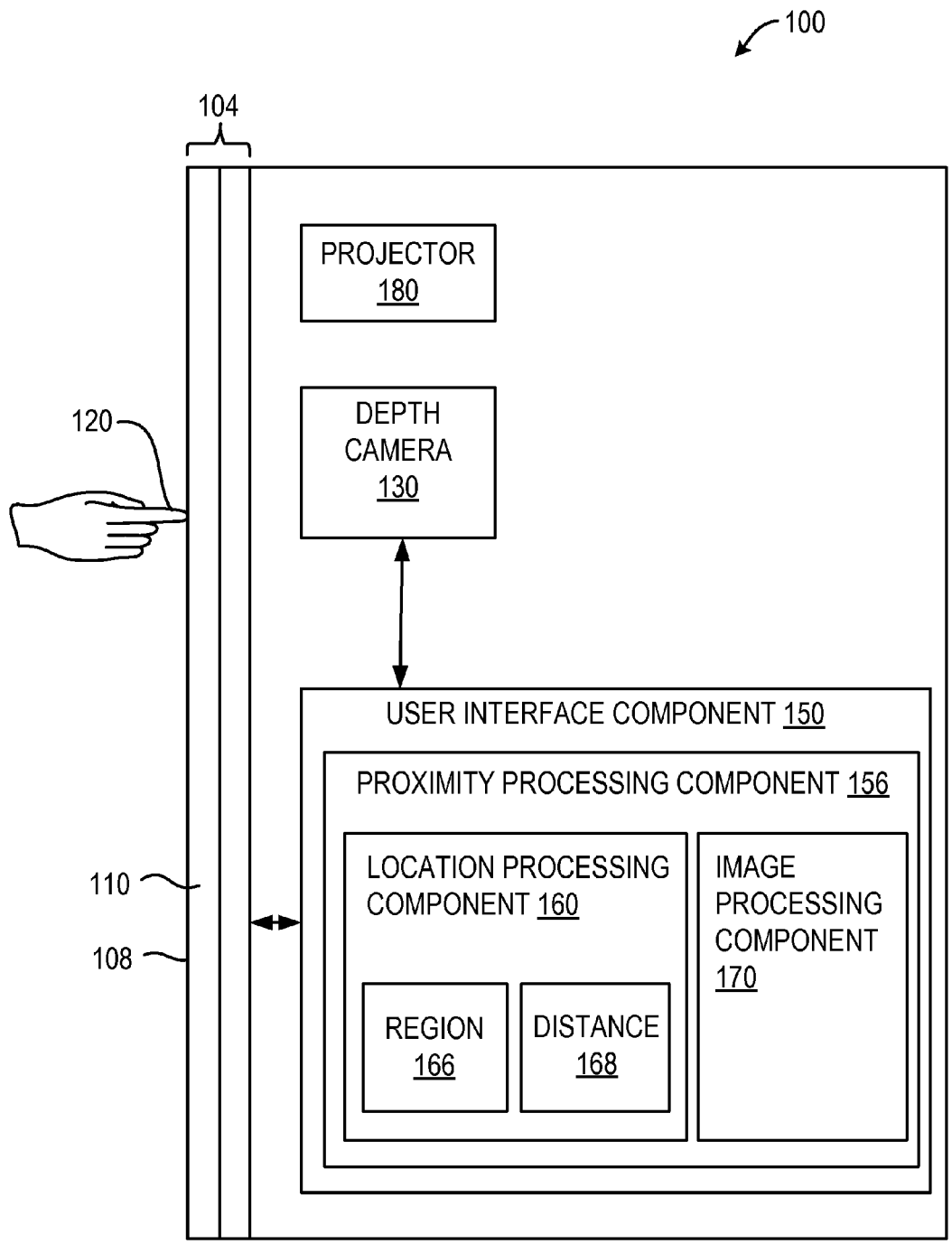
FIG. 1 illustrates a block diagram of an apparatus for providing information about an object in proximity to a screen according to an embodiment of the present invention.

The drawings referred to in this Brief Description should not be understood as being drawn to scale unless specifically noted.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

The present invention is a system and method for providing object information about an object in proximity to a first surface of a display screen. The object information can be used to provide a richer user interface capable of simulating a multi-touch experience. The apparatus 100 includes: a screen 104 having a display surface 108; a physical contact sensing component 110 for providing physical contact information regarding whether an at least first object 120 has made physical contact with the display surface 108 of the screen 104; and a depth camera 130 physically positioned to capture the object location information related to the at least first object 120 located in front of the display surface 108, the object location information including the location on the display surface 108 that the at least first object 120 is located in front of, the object location information further including the distance of the at least first object 120 from the display surface 108; and a user interface component 150 for processing physical contact information and object location information received from the physical contact sensing component 110 and depth camera 130.

FIG. 1 illustrates a block diagram of a system or apparatus 100 for providing information about an object in proximity to a screen according to an embodiment of the present invention. As described, the system includes both (1) a physical contact sensing component 110 and (2) a depth camera 130. The physical contact sensing component 110 can be used for determining whether an object has made physical contact with the display surface and if physical contact has been made, the location on the screen that the object has made contact with. The depth camera 130 can be used for determining: (1) the area or location of the screen that the object is positioned in front of; (2) the distance that the object is from the display surface of the screen; and (3) whether a single object or multiple objects are located in front of the display surface in proximity to the screen.

Both the physical contact sensing component and the depth camera have weaknesses in terms of the information they can provide, the integrity or accuracy of the provided information, etc. By combining information from both sources and making assumptions based on the combination of physical contact sensing component and the depth camera, the information from one source of information (depth camera or physical sensing component) can be used to the augment the information from the other source. This improved information set provides increased accuracy of information and improved data regarding how touch or movements in front of the display screen occurred. Thus, a richer user interface may be provided. For example, the combination of a resistive touch screen and depth camera can provides improved performance over a resistive touch screen implementation by providing, for example: 1) improved drag performance, 2) the ability to add a hover state to touch screen interactions and 3) the ability to simulate multi-touch capabilities on a touch screen that by itself only supports single touch.

Many screen for digital devices are currently implemented using LCD (Liquid Crystal Display) screens. However, in the embodiment shown in FIG. 1, the screen in addition to an LCD display screen also includes a physical contact sensing component 110 that is capable of detecting when an object 120 comes into physical contact with the first display surface of the screen. In one embodiment, the physical contact sensing component is a resistive touch screen. In one embodiment, the resistive touch screen is integrated into or positioned in front of the LCD screen. This involves augmenting the screen to include resistive touch screen elements.

Although many implementations are possible, in one embodiment an electronic touch screen is implemented using two flexible sheets coated with a resistive material and separated by an air gap. When an object contacts the surface of the screen, the two resistive sheets are pressed together. A change in voltage occurs at the location that the object touches the screen. In one embodiment, a uniform unidirectional voltage gradient is applied to both the first and second resistive sheets. By measuring voltage as distance along the resistive sheets, the X and Y coordinates can be determined based on the change in the voltage.

In the example previously described, the physical contact sensing component 110 is implemented using resistive thin films. However, other touch screen implementations that are capable of registering at least one touch are also possible. For example, in one embodiment capacitive electronic thin films are used. In either the resistive or capacitive film case, an object coming into contact with the film will change the electronic characteristics of the film in the area that was touched. Thus providing information that a touch occurred and the location of the touch on the screen surface.

Referring to FIGS. 1-4, the depth camera 130 is positioned to view at least the space immediately in front of the screen. Depth camera information is used to augment data provided by a resistive touch screen implementation to provide a richer user interface and can be implemented in many ways. The camera is used for capturing the image of the object in front of the screen. The depth sensor provides distance information about the distance of the object from the depth sensor. Although the depth sensor measures the distance of the object from the depth sensor, many references are made in the application to the distance from the screen surface. Typically this distance (the distance from the screen surface) is calculated knowing the physical position of the depth camera and the physical location of the screen surface with reference to the depth camera.

According to one embodiment, the depth sensor can capture three dimensional (3D) shapes of the object 120. The depth sensor component of the depth camera use any one or more of an active depth sensor, a stereo depth sensor, a multi-camera depth sensor, or a structured light depth sensor, among other things. For example, in one embodiment an active depth sensor actively measures the distance by transmitting a light pulse and determining the amount of time it takes for the light to return after the pulse bounces off of the object 120. In another embodiment, a stereo depth sensor determines the distance between the object and the depth sensor using stereo vision.

Referring to FIG. 1 shows a user interface component. The user interface component is coupled to the depth camera 130 and screen 104 of the system. Electrically coupling the user interface component to the depth camera and screen allows information from both the (1) physical sensing component (typically integrated into or integrated in proximity to the screen) and/or (2) the depth camera 130 to be received by and processed by the user interface component. In one embodiment, object information received by the user interface component 150 is used to determine the type of user interface that is made available to the user of the system.

The term user interface is used to describe any system input or output (or the hardware or software mechanism supporting system input or output) that can be sensed by a user. For example, in one embodiment the system output is a display that can be viewed by the user on a screen. For example, a user could view a menu that is output on the display screen of the system. The user could choose (or not choose) to input a menu selection by touching the screen to indicate a possible selection.

In the embodiment shown, the user interface component 150 includes a proximity information processing component 156 for processing information related to object information about an object in proximity to the screen. Two types of proximity information are discussed in this example: location information (processed by the location processing component 160) and image information (processed by the image processing component 170).

In one embodiment, the location processing component 160 includes a region processing component and a distance processing component. The region processing component 166 processes information regarding the point or area where the object physically touches the display surface of the screen. In one embodiment, this information can be provided by the physical touch sensing component and/or by the depth camera. For the depth camera case, the region processing component can give the point or area where the object physically touches (distance from screen surface=0). Alternatively, for cases where the object is hovering and not touching, the location processing component could indicate the point or area on the screen over which the object is hovering. In one embodiment, this point/area could be a projection of the object onto the screen at a 90 degree angle (or other chosen angle) or the projection along the line of movement of the object onto the screen. The distance processing component 168 processes information from the depth camera regarding the distance of the proximal object from the first surface of the display screen.

In one embodiment, the proximity information processing component 156 includes an image processing component 170. The image processing component 170 processes information regarding the image captured by the depth camera. For example with reference to the method shown in the flow diagram of FIG. 6, the images captured by the depth camera could be processed by the image processing component to be used to determine (or confirm) that a single or multiple objects were touching the display surface.

In one embodiment, object information from the physical sensing component 110 is correlated to object information from the depth camera 130. In one embodiment, object information is correlated by location and/or time by the user interface component 150. For example, information is recorded from the physical sensing component regarding the time and location of the physical touch to the screen. Similarly, information is recorded from the depth camera regarding the time and location above the screen of the hovering object or in the case of a physical touch, the time and location of the physical touch. For example, object information could be correlated at a location (x,y) at different times. Say, that at time t1 the depth camera records an object at location (x,y) a distance of 0.5 inches away from the display screen. Also, at time t1, the physical sensing component does not register a touch at location (x,y). Then at time t2 the depth camera records the object at location (x,y) a distance of 0.0 inches away from the display screen. As expected, the physical sensing component confirms the physical touch at time t2 by registering a touch at location (x,y).

As previously discussed, the current system can be used to provide verification of the authenticity of the provided object information. For example, the distance accuracy of the sensor in depth cameras is limited. The sensor may not be accurate enough to distinguish between an object touching the screen (0.0 inches) and just not touching the display screen (say, for example 0.5 inches). Thus, if the depth camera registered an object to be 0.0 inches from the screen, but the physical sensing component did not register a physical touch, then the accuracy of the physical sensing component is assumed to be more reliable. For the case where the depth camera registers an object to be 0.0 inches from the display screen but no physical touch is registered, the at least first object is assumed to be hovering near the screen. However, for the case where the depth camera registers an object to 0.0 inches from the screen, and the physical sensing component registers a physical touch, both components authenticate the other's data.

FIG. 1 is a block diagram of an apparatus 100 for determining whether an object has come into contact with a screen, according to one embodiment. FIG. 2 illustrates a schematic representation of a visual-collaboration system in accordance with the block diagram of FIG. 1. Referring to FIGS. 1 and 2, the apparatus 100 includes a screen 104, a projector 180, a video recording depth camera 130 and a user interface component 150. According to one embodiment, the screen 104 is configured for displaying an image that is projected, for example, by the projector 130 from inside of the apparatus housing onto the screen 104. According to one embodiment, the screen 104 is a "see through screen," that enables the video recording depth camera 130 to record the images of the objects 120 that are located in front of the first display screen. Further details of the implementation of the video-conferencing system utilizing a see through screen are described, for example, in pending application "Systems for Capturing Images Through a Display", Ser. No. 12/432,550, filed Apr. 28, 2009.

Referring to FIG. 2 shows a user positioned in front of a display surface. The display of the digital device is seen by the user and responsive to user interaction (i.e. touch input, mouse input, keyboard input, etc.), the user can interact with the digital content. Also by way of example, as a part of video conferencing, users at two different locations may want to collaborate by touching the screen 104 with their fingers or with a pointing device in order to write on the screen 104 or manipulate icons displayed on the screen 104, among other things.

In one embodiment, the finger of a user or a pointing device are examples of an object 120 that can come into contact with the screen 104. The object corning into contact with the screen can be detected by either the depth camera 130, the physical contact sensing component 110 or by both. Although in the embodiment shown in FIG. 1 there is one object shown, multiple objects may be shown in front of the screen.

Figure 5:
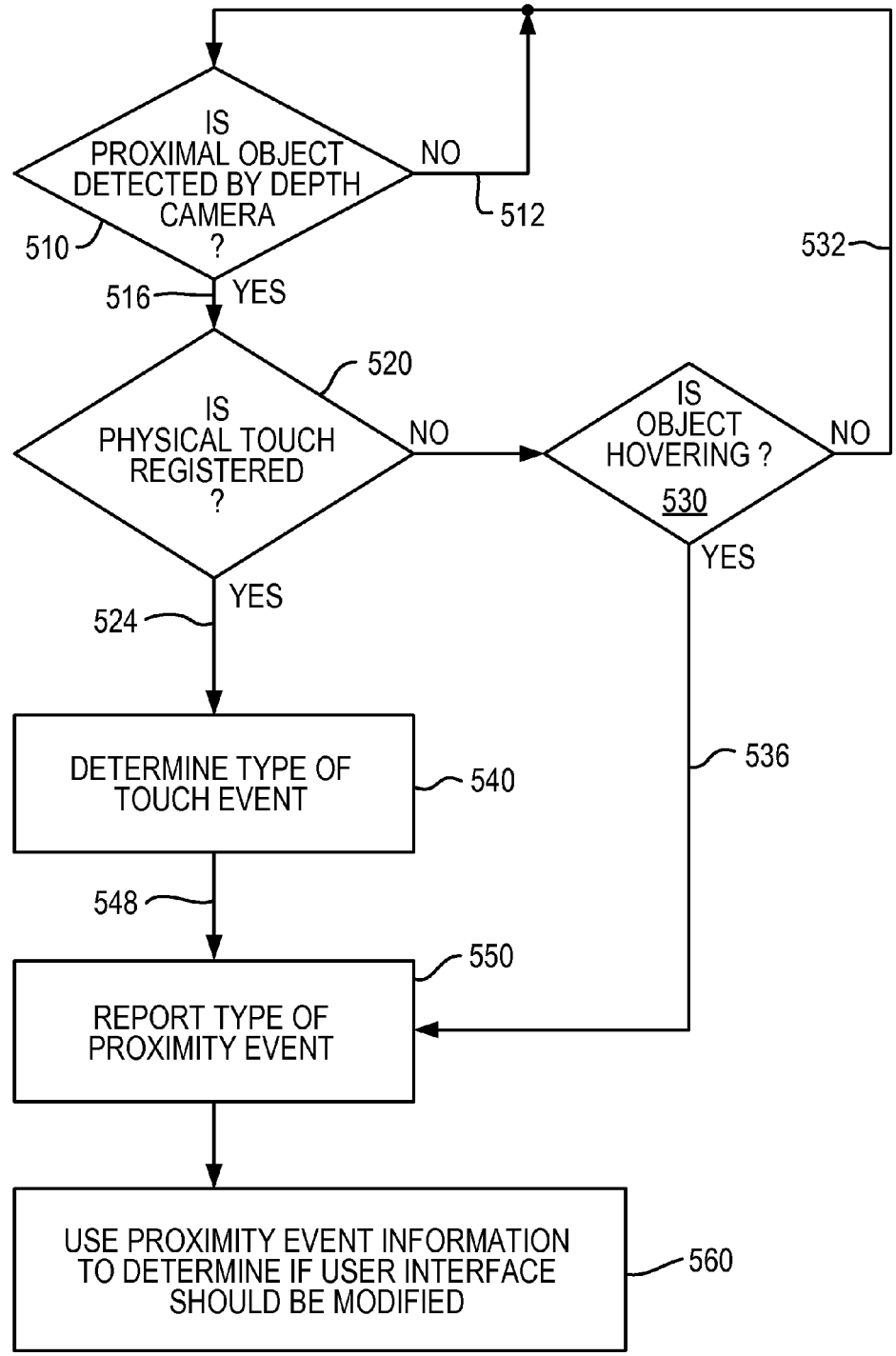
FIG. 5 illustrates a flow diagram for a method of providing information about an object according to an embodiment of the present invention.
Figure 6:
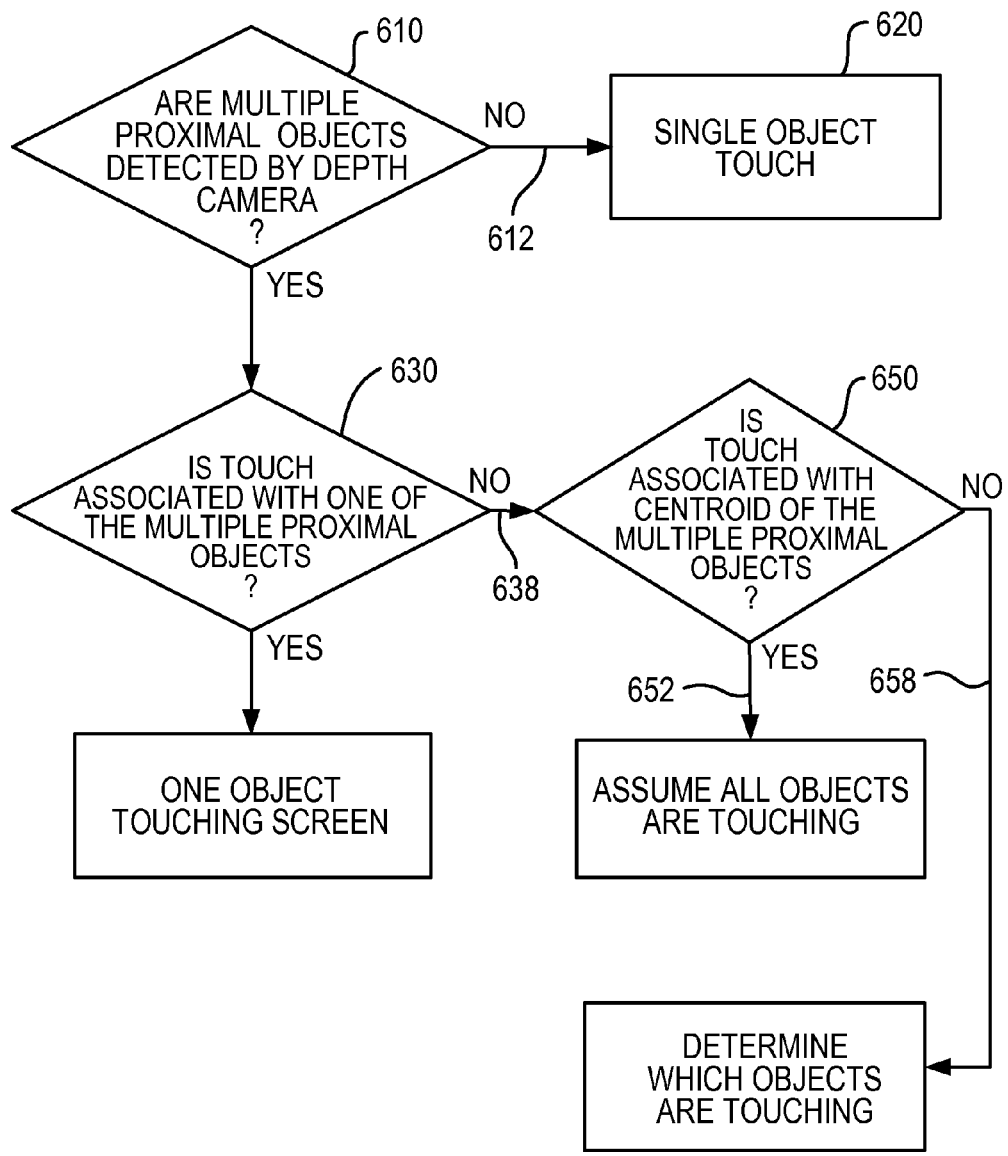
FIG. 6 illustrates a flow diagram for a method of determining the type of touch event that has occurred according to an embodiment of the present invention.

The determination as to whether multiple objects are touching the screen is described in further detail with respect to flow diagrams in FIGS. 5 and 6. The ability to discriminate multiple objects touching the screen is supported by depth camera and physical contact sending component. Confirmation of physical touch of objects can be supported by physical contact sensing component.

Although the block diagram shown in FIG. 1 corresponds to the implementation shown in FIG. 2 (projector placement behind the screen), the claimed system and method recited can also be applied to other implementations. For example, referring to FIG. 3 shows a schematic representation of a touch screen board configured with an active depth camera. Because the touch screen board is not see-through, the active depth camera is positioned in front of the display surface so that it can monitor near screen interactions. Similarly, FIG. 4 illustrates a schematic representation of a notebook personal computer configured with an active depth camera. Again, because the screen is not a see-through screen, the depth camera is positioned in front of the display surface to monitor near screen interactions.

As previously stated, in one embodiment the physical contact sensing component 110 is a resistive touch screen that is integrated into or part of the screen. The resistive touch screen indicates not only that an object has touched a screen, but the location where the touch occurred. The method may be extended to touch screens that detect only that the screen has been touched, but not the location of the touch event. Referring for example to FIG. 4, shows a notebook computer that includes an active depth camera and physical contact sensing component. In one embodiment, the physical contact sensing component is a resistive touch screen. However, in the cases where the location information reported by the depth camera is of sufficient accuracy, it may be sufficient to forego the touch screen on the display and simply have some kind of physical contact sensor (i.e., a pressure, force, or acceleration sensor) that registers any contact with the screen.

For example, in the case of a notebook PC as shown in FIG. 4, a physical contact sensor could detect a force applied to the screen hinge. When an object touches the screen it pushes the screen back applying a force to the screen hinge. Detection of an applied force by the physical contact sensing component provides confirmation that the screen has been touched—but not the location of the touch. Similarly other types of physical contact sensors could also be used. For example, an audio sensor could also be used to as a indicator of physical contact—the sound of the object touch on the screen would indicate a physical touch but not the precise location of the touch on the screen. In another example, a vibration sensor could be used to indicate that a physical touch on the screen surface has occurred. In this case the vibration sensor would sense vibration applied to the screen when an object touches the screen.

In one embodiment, the processing of object information is performed according to the steps shown in the flow diagrams of FIGS. 5 and 6. FIG. 5 illustrates a flow diagram for a method for providing information about in object in proximity to a screen according to an embodiment of the present invention. The method includes step 510 where using information recorded by the depth camera, it is determined whether an object is in the proximity of the first display surface of the screen 104. The depth camera 130 can monitor all near-screen interactions and is positioned so that it can view an object placed in front of the screen surface. In one embodiment, any object that can be detected by the depth camera (no matter what the distance from the screen) is considered to be a proximal object according to step 510. In another embodiment, whether an object is considered to be a proximal object is dependent on the distance of the object from the screen. The proximity distance, the distance of the object from the screen, may be a predetermined minimum, maximum or range of values that indicate a distance from the screen. For example, a proximity value could be set at a value of two inches away from the screen. In this case, any object captured by the depth camera and positioned less than or equal to two inches away from the screen surface would be considered to be a proximal object. The predetermined proximity value set might be set by the software designer or alternatively a predetermined value could be set by the user or the system administrator.

If a proximal object is not detected (step 512) then the system keeps looking for a proximal object. When a proximal object is detected by the depth camera (step 516), the system attempts to determine whether a physical touch is registered (step 516) by the physical sensing component 110. Referring to FIG. 5, if an object that is proximal to the screen surface is detected by the depth camera, then the next step is to determine whether a physical touch is registered. If a physical touch is registered (step 524) then the next step is to determine the type of touch event that occurred (step 540). FIG. 6 illustrates a flow diagram that provides additional detail for step 540, the step of determining the type of touch event that has occurred.

Although in the embodiment shown in FIG. 1, the object 120 is physically touching the screen. In one embodiment the object 120 is hovering in front of the display screen. In the method shown in FIG. 5, hovering occurs when a proximal object is detected and no physical touch is registered and the object is within a predetermined hover distance. Again referring to FIG. 5, if a proximal object is detected and no physical touch is registered, then the next step is to determine if the object is hovering (step 530) by determining whether the object is within the hover distance. In an alternative embodiment, step 530 is eliminated and an object is considered to be hovering if it is detected by the depth camera and no physical touch is detected.

Referring to FIG. 5, a determination of whether an object is made by determining whether an object is within a hover distance (step 530). The hover distance or hovering distance is the distance between the object and the screen within which the object is considered to be hovering. According to the method described, different displays or user interfaces may be presented on the screen responsive to whether an object is touching the screen or is hovering in front of the screen.

Because an object hover can result in different content being displayed, it may be desirable to set the hover distance to a predetermined distance to ensure that resulting actions do not occur indiscriminately. For example, say that a hovering distance is considered to be any distance between 0.1 inches and 1 inch. If the active depth camera can capture an image any distance less than one foot from the screen, only when the object comes to a distance 1 inch or less from the screen will the object be considered to be hovering.

In an alternative embodiment, instead of monitoring an area greater than the hover distance, the angle of the depth camera is configured so that it can only detect objects that would be considered to be hovering. In the previous description, the depth camera would be set up to only capture objects a distance less than or equal to one inch from the screen. In this case, there is no step to determine whether the object is within a hover distance, instead the fact that the depth camera detects the object means that the object is hovering.

If no physical contact is registered with the screen (step 524) and the object is not within the hover distance (step 534), the system continues to monitor (step 532) the area in front of the screen for a proximal object. If it is determined that the object is hovering, this proximity event information is provided to the system (step 550). The proximity event information typically provided to the system includes the type of proximity event—in this case hovering. It may also include other information, such as the location of the region in front of the screen which the object is hovering and the distance of the hovering object from the first surface of the screen.

Figure 7:
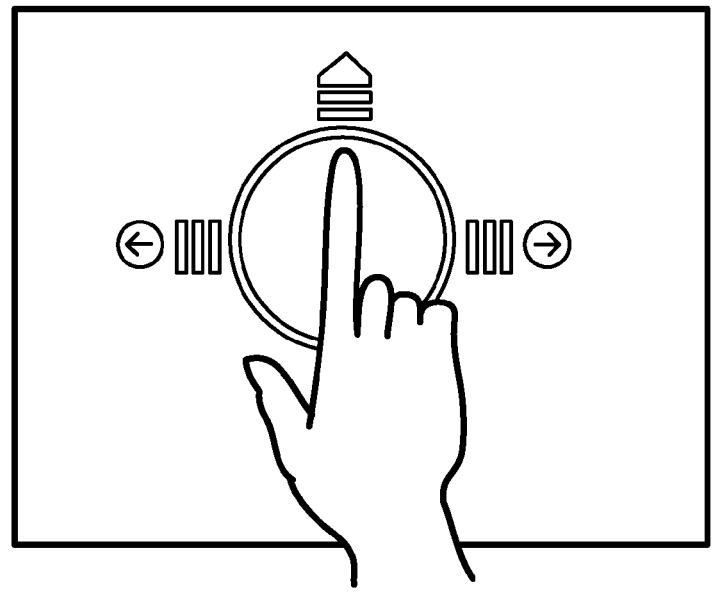
FIG. 7 illustrates a schematic representation of a menu screen that appears when an object is hovering in front of the screen in accordance with an embodiment of the present invention.
Figure 8:
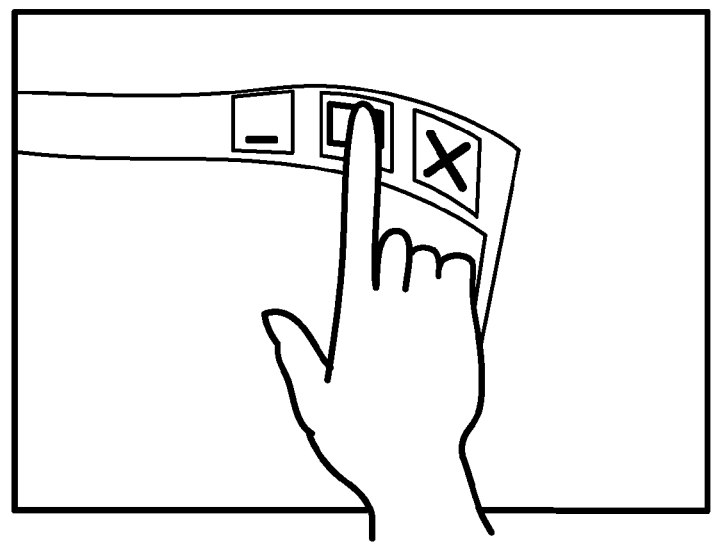
FIG. 8 illustrates a schematic representation of a magnification of the screen menu when an object is hovering in front of the display surface according to an embodiment of the present invention.

The object information reported and provided to the system may be used by the system (step 560) to determine whether user interface should be modified. Modifying the user interface is meant to include modifications to the user interface devices and how the devices respond to user and further includes modifications to how information is shown or presented to the user, and how the user interface device responds to user input. For example, in one embodiment, the fact that the object is hovering results in a modification of the data presented, such as modification of the user interface in the vicinity of the hovering object. Referring to FIGS. 7 and 8 illustrate user interface possibilities that could be implemented when an object is hovering over a screen area. FIG. 7 illustrates a schematic representation of a menu screen that appears when an object is located in front of a menu location in the hover state.

In the embodiment shown in FIG. 7, the presence of an object (in the embodiment shown a hand), causes a menu or other user interface to appear. In the example shown, the menu appears on the screen in the area that the object is hovering above. Responsive to the object hovering over a particular screen area or location, screen data (i.e., text, images, etc.) that was previously displayed to the user on the screen may change, causes the system to display different information (in this case a menu). In the menu shown, specific items in the menu can be selected by an object touching the screen.

FIG. 8 shows an alternative implementation that is displayed responsive to an object is hovering in front of the display screen. Specifically, FIG. 8 illustrates a schematic representation of a magnification of the screen menu when an object is physically located above the screen menu in the hover state. In FIG. 8, the information displayed on the screen is modified by increasing the magnification of the screen in the area that the object is hovering over. In this case, existing interface elements are magnified, enabling more accurate touch-based interaction with existing interface elements easier.

In both FIGS. 7 and 8, an optional feedback mechanism is illustrated. In this embodiment, the presence of an object (in this case the user's hand) close to the screen causes a "shadow" to be overlaid on the displayed image. In one embodiment, the shadow gets darker depending on sensed proximity of the screen. In one embodiment, the shadow gets darker as the object get closer to the screen and the shadow lightens as the object moves further away from the screen.

Referring to the flowchart in FIG. 5, if a physical touch is registered on the screen, then a determination is made as to the type of physical touch (step 540) that has occurred. The details of this process are shown in FIG. 6 which illustrates a flow diagram for a method of determining the type of touch event that has occurred. In one embodiment, the system determines whether the touch event that registered was made by a single or alternatively multiple objects.

According to the embodiment shown in FIG. 6, a step in determining the type of touch event that occurred is determining whether multiple objects are detected proximal to the screen (step 610). The determination as to whether the touch is made by multiple objects is made using image information from the depth camera. If the depth camera does not register multiple objects, only a single proximal object is registered (step 612) in the vicinity of the touch location. Then it is determined that a single object is touching the screen (step 620).

If multiple objects are detected (step 622) proximal to the screen, then the next step (step 630) is to determine if the touch is associated with one object of the multiple proximal objects. Assuming sufficient camera resolution, the depth camera can distinguish each object of the multiple proximal objected captured by the camera. In one embodiment, the multiple proximal objects are the five fingers of a hand and the depth camera has sufficient resolution to distinguish between each the five different finger of the hand. Based on the location of the touch, the system then determines if the touch was associated with a single proximal object or multiple proximal objects (step 630). If the touch was associated with a single proximal object (step 634), the assumption is that one finger (one object) is touching the screen (step 640).

The system uses information from the depth camera to determine if the touch is associated with one of the multiple proximal objects (step 630). If instead of being associated with a single proximal object, the touch is associated with multiple proximal objects (step 638) then the system tries to determine if the physical touch is associated with the centroid of the multiple proximal objects (step 650). Typically if multiple objects are touching a resistive touch screen in an area of the screen, instead of being associated with a single location that corresponds to a single proximal object, the touch is registered in a location associated with the centroid of the multiple proximal objects. In one embodiment, a determination is made as to whether the touch of the object is associated with the centroid of the multiple proximal objects (step 660). If the touch is associated with centroid of the multiple proximal objects, it is assumed that all of the proximal objects are touching the screen (step 664). If the touch is not associated with the centroid (step 658), then further processing is required to determine which of the multiple fingers are touching the screen (step 660). This could include testing the touch location against centroids computed for all combinations of sensed proximal objects.

Referring back to the flowchart in FIG. 5, after the type of physical touch has been determined (step 548) or after it has been determined that an object is hovering (step 530), the type of proximity event that has occurred (i.e. single physical touch, multiple physical touch, hovering event, etc.) is provided to the system (step 550). Other proximity event information (i.e. the number of objects touching, the location of the touch, etc.) may also be provided. The proximity event information is used by the system by the user interface component to determine whether what type of data should be sent to the system. For example, in the hovering case, data would be sent from the user interface to the system to let know that when the system is hovering over the area and/or screen data shown, that the display should be modified such as is shown in FIGS. 7 and 8.

As previously stated, the combination of a touch screen that supports single touch and a depth camera provides improved performance over other touch screen device that support single touch by providing, for example: 1) the ability to add a hover state to touch screen interactions, 2) the ability to simulate multi-touch capabilities on a touch screen that by itself only supports single touch and 3) improved drag performance. As previously discussed with respect to FIG. 5 and as shown in FIGS. 7 and 8, the addition of the depth camera to the described invention provides for the ability to add a hover state to touch screen interactions.

The combination of the depth camera to the touch screen supporting single touch enables true multi-touch interaction and allows for the creation of novel and rich user interfaces. For example, the combination of touch (enabled by physical sensing component) and hover (enabled by depth camera) could support a gesture that combines rotating and translating an object. One hand, for example, could touch the screen with one finger to indicate a pivot point and to drag to translate the object to another point on the screen. Another hand or finger on the hand, at the same time, could be moving (close to the screen—but without touching) in a rotating motion to control rotation. Other multi-touch interactions could include, but not be limited to, for example scrolling with two fingers, using five fingers typing with each hand.

The combination of a touch screen that supports single touch and a depth camera provides improved drag performance. When a continuous drag gesture on the screen is tracked via an film touch screen capable of monitoring single touch, there may be times when the touch event fails to register due to changing finger pressure on the screen. In the present invention, information from the depth camera can be used to detect the continuing drag gesture (possibly through lowering the touch screen sensor threshold and disambiguating the resulting more noisy data.)

Figure 9:
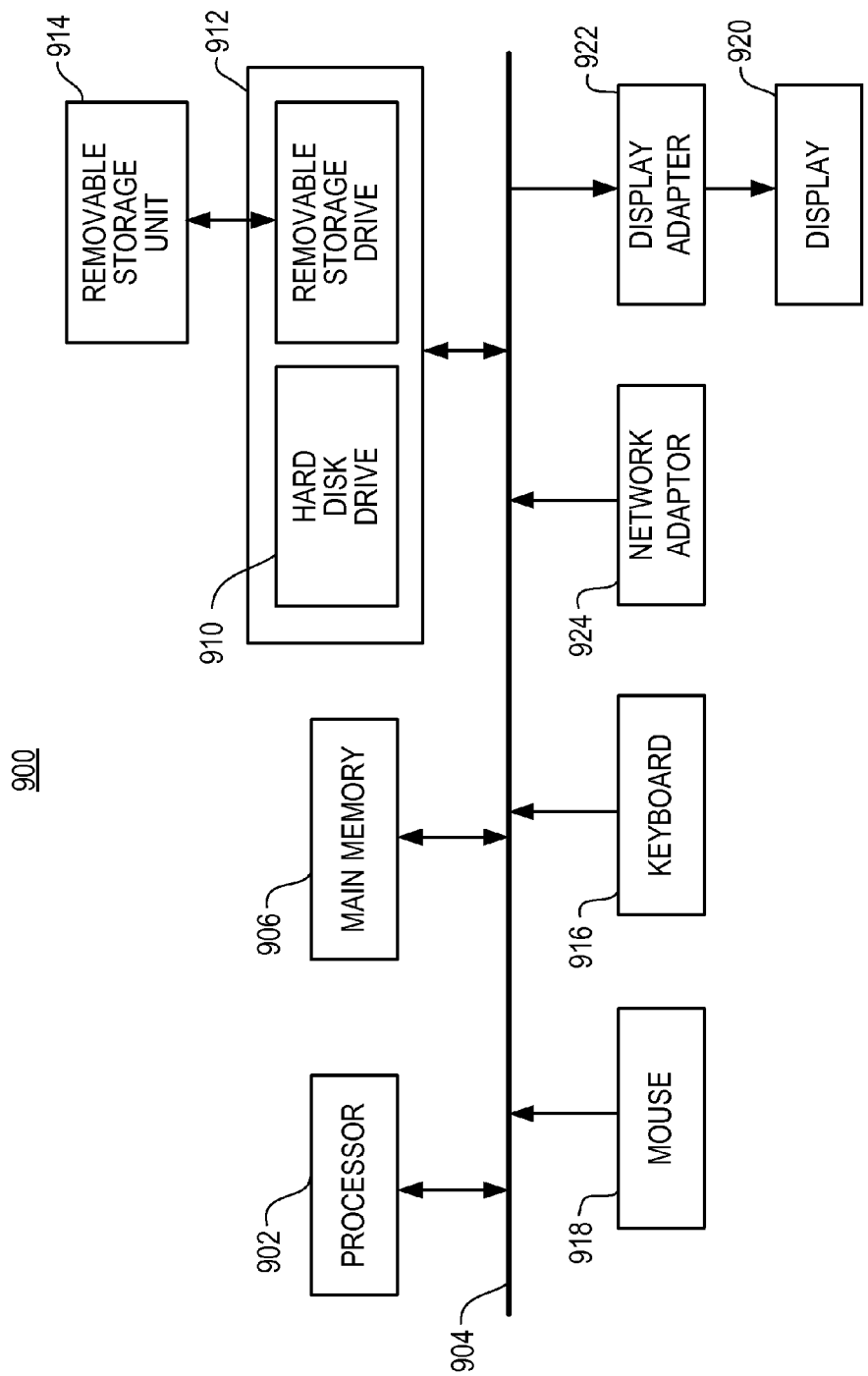
FIG. 9 is computer system for implementing the methods in accordance with an embodiment of the present invention.

FIG. 9 illustrates a computer system, which may be employed to perform various functions described herein, according to one embodiment of the present invention. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

The computer system 900 includes a processor 902 that may be used to execute some or all described in the application including the steps described in the methods shown in FIGS. 5 and 6. In one embodiment, some are all of the components shown in FIG. 9 are used to implement the system 100. In one embodiment, a processing device such as processor 902 can be used to implement the interface control component. Commands and data from the processor 902 are communicated over a communication bus 904. The computer system 900 also includes a main memory 906, a secondary memory, such as a random access memory (RAM), where the program code for, for instance, may be executed during runtime. The secondary memory 908 includes for example, one or more hard disk drives 910 and/or a removable storage drive 912, representing a floppy diskette drive, a magnetic tape drive, a compact disk drive, etc., where a copy of the program code for processing object information related to an object in proximity to a screen may be stored.

Some or all of the operations set forth in the method shown in FIGS. 5 and 6 may be contained as a utility, program or subprogram, in any desired computer accessible medium. In addition, the method described in the application may be embodied by a computer program, which may exist in a variety of forms both active and inactive. For example, it exist as software program(s) comprised of programs instructions in source code, object code, executable code or other formats. Certain processes and operation of various embodiments of the present invention are realized, in one embodiment, as a series of instructions (e.g. software program) that reside within computer readable storage memory of a computer system and are executed by the processor of the computer system. When executed, the instructions cause the computer system to implement the functionality of the various embodiments of the present invention. Any of the above can be embodied on a computer readable medium, which include storage devices and signals, in compressed or uncompressed form.

The computer readable storage medium can be any kind of memory that instructions can be stored on. Examples of the computer readable storage medium include but are not limited to a disk, a compact disk (CD), a digital versatile device (DVD), read only memory (ROM), flash, RAM, EPROM, EEPROM, and magnetic or optical disks or tapes, and so on. Exemplary computer readable storage signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore understood that any electronic device capable of executing the above-described functions may perform those functions enumerated above.

The removable storage drive 910 may read from and/or write to a removable storage unit 914. User input and output devices may include, for instance, a keyboard 916, a mouse 918, and a display 104. A display adaptor 922 may interface with the communication bus 904 and the display 104 and may receive display data from the processor 902 and covert the display data into display commands for the display 920. In addition, the processor 902 may communicate over a network, for instance, the Internet, LAN, etc. through a network adaptor. The embodiment shown in FIG. 9 is for purposes of illustration. It will be apparent to one of ordinary skill in the art that other know electronic components may be added or substituted in the computer system 900.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A system for providing object information, the system comprising:
   a screen having a display surface;
   a physical contact sensing component to generate physical contact information regarding whether at least an object has come into physical contact with the display surface of the screen; and
   a depth camera physically positioned to generate object location information by capturing a location of the object located in front of the display surface, the object location information including a region of the screen that the object is located in front of and further including object distance information related to the distance the object is located away from the front of the screen; and
   a user interface component coupled to the physical contact sensing component and to the depth camera, the user interface component to, in response to detecting a physical touch via the physical contact sensing component, determine a type of touch event based on the physical contact information and based on the object location information, the type of touch event including a first type associated with a single proximal object and a second type associated with multiple proximal objects.

2. The system recited in claim 1, wherein responsive to the physical contact information, object location information, and object distance information provided, the user interface component is to determine whether to modify a user interface.

3. The system recited in claim 1, wherein the physical contact sensing component is a resistive touch screen element.

4. The system recited in claim 1, wherein the object distance information from the depth camera and the physical contact information from the physical contact sensing component is used to determine whether the object has touched the display surface of the screen.

5. The system recited in claim 1, wherein in response to a determination of the second type of touch event, the user interface component is to determine whether the physical touch is associated with a centroid of the multiple proximal objects.

6. A system for providing object information, the system comprising:
   a screen having a display surface;
   a physical contact sensing component to provide physical contact information regarding whether an object has physically contacted the display surface;
   an image capture device positioned to capture a location of the object located in front of the display surface, the image capture device to generate object location information including a region of the screen that the object is located in front of and further including object distance information about whether the object is within a hover distance from the display surface; and
   a user interface component, coupled to the physical contact sensing component and to the image capture device, to:
     in response to detecting a physical touch via the physical contact sensing component, determine a type of touch event based on the physical contact information and based on the object location information, the type of touch event including a first associated with a single proximal object and a second type associated with multiple proximal objects; and
     in response to detecting the object being within the hover distance and no registration of physical contact by the physical contact sensing component, determine whether to modify a user interface.

7. The system recited in claim 6, wherein in response to a determination that the user interface is be modified, the user interface component is to modify the user interface by providing a touch sensitive menu.

8. The system recited in claim 7, wherein the touch sensitive menu is displayed on the screen in the region of the screen where the object is hovering in front of.

9. The system recited in claim 6, wherein in response to a determination that the user interface is to be modified, the user interface component is to modify the user interface by magnifying data displayed on the screen in the region of the screen where the object is hovering in front of.

10. The system recited in claim 6, wherein in response to a determination that the user interface is to be modified, the user interface component is to modify the user interface by changing content displayed on the screen in the region of the screen that the object is hovering in front of.

11. A non-transitory computer readable storage medium instructions when executed cause a processor of a computer system to:
    determine whether an object is located within a proximal distance of a display surface of a screen of the computer system based on object location information provided by a depth camera of the computer system, wherein the object location information includes a region of the screen that the object is located in front of and further including object distance information about whether the object is within a hover distance from the display surface;

determine whether the object has physically contacted the display surface based on physical contact information provided by a physical contact sensing component of the computer system;

determine whether a user interface is to be modified based on the object location information and the physical contact information; and in response to detecting a physical touch based on the physical contact information, determine a type of touch event based on the physical contact information and based on the object location information, the type of touch event including a first type associated with a single proximal object and a second type associated with multiple proximal objects.

12. The computer readable storage medium recited in claim 11, wherein the instructions when executed further cause the processor to determine whether the object is hovering in response to a determination that the object has not contacted the display surface of the screen.

13. The computer readable storage medium recited in claim 11, wherein the instructions when executed further cause the processor to:

in response to a first determination that the object is at a first sensed proximity of the screen, instruct the screen to display a shadow on a displayed image; and in response to a second determination that the object is at a second sensed proximity of the screen, instruct the screen to darken the shadow.

14. The computer readable storage medium recited in claim 11, wherein the instructions when executed further cause the processor to, in response to a determination of the second type of touch event, determine whether the physical touch is associated with a centroid of the multiple proximal objects.

15. A method executed on a processor for providing object information, the method comprising:

determining whether an object is located within a proximal distance of a display surface of a screen of a computer system based on object location information provided by a depth camera of the computer system, wherein the object location information includes a region of the screen that the object is located in front of and further including object distance information about whether the object is within a hover distance from the display surface;

determining whether the object has physically contacted the display surface based on physical contact information provided by a physical contact sensing component of the computer system;

determine whether a user interface is to be modified based on the object location information and the physical contact information; and in response to detecting a physical touch based on the physical contact information, determine a type of touch event based on the physical contact information and based on the object location information, the type of touch event including a first type associated with a single proximal object and a second type associated with multiple proximal objects.

\* \* \* \* \*